United States Patent
Penzo et al.

(10) Patent No.: US 12,330,147 B2
(45) Date of Patent: Jun. 17, 2025

(54) APPARATUS AND PROCESS FOR THE GAS-PHASE POLYMERIZATION

(71) Applicant: Basell Polyolefine GmbH, Wesseling (DE)

(72) Inventors: Giuseppe Penzo, Mantova (IT); Maurizio Dorini, Ferrara (IT); Riccardo Rinaldi, Ferrara (IT); Silvia Soffritti, Ferrara (IT); Giulia Mei, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 503 days.

(21) Appl. No.: 17/782,047

(22) PCT Filed: Dec. 9, 2020

(86) PCT No.: PCT/EP2020/085237
§ 371 (c)(1),
(2) Date: Jun. 2, 2022

(87) PCT Pub. No.: WO2021/155977
PCT Pub. Date: Aug. 12, 2021

(65) Prior Publication Data
US 2023/0001372 A1    Jan. 5, 2023

(30) Foreign Application Priority Data
Dec. 11, 2019    (EP) .................................... 19215247

(51) Int. Cl.
*B01J 8/00* (2006.01)
*B01J 8/18* (2006.01)
(Continued)

(52) U.S. Cl.
CPC .............. *B01J 8/1827* (2013.01); *B01J 8/005* (2013.01); *B01J 8/0055* (2013.01); *B01J 8/1863* (2013.01);
(Continued)

(58) Field of Classification Search
USPC .................................... 526/65, 918; 422/134
See application file for complete search history.

(56) References Cited

U.S. PATENT DOCUMENTS 10,968,291 B2 *   4/2021   Meier ....................... C08F 2/01
2004/0136881 A1   7/2004   Verser et al.
(Continued)

FOREIGN PATENT DOCUMENTS

CN    110088142 A    8/2019
EP         460735 A2   12/1991
(Continued)

OTHER PUBLICATIONS

The International Search Report and Written Opinion for PCT/EP2020/085237 mailed Jul. 23, 2021.

*Primary Examiner* — Fred M Teskin

(57) ABSTRACT

Apparatus for carrying out a catalytic gas-phase olefin polymerization having a first polymerization zone for growing polymer particles to flow upward under fast fluidization or transport conditions, a second polymerization zone for the growing polymer particles to flow downward, and a gas/solid separation zone; wherein the second polymerization zone has an upper part being connected to the separation zone and a lower part being connected to the upper part; wherein the ratio of the height H01 of the separation zone to the diameter D01 of the separation zone is 2.5 to 4.5.

20 Claims, 2 Drawing Sheets

(51) Int. Cl.
*B01J 8/26* (2006.01)
*B01J 19/24* (2006.01)
*C08F 2/34* (2006.01)
*C08F 10/00* (2006.01)

(52) U.S. Cl.
CPC ............. *B01J 8/26* (2013.01); *B01J 19/2435* (2013.01); *C08F 10/00* (2013.01)

(56) References Cited

U.S. PATENT DOCUMENTS

| | | |
|---|---|---|
| 2007/0049782 A1 | 3/2007 | Patel et al. |
| 2013/0165605 A1 | 6/2013 | Soffritti et al. |

FOREIGN PATENT DOCUMENTS

| | | |
|---|---|---|
| EP | 3321288 A1 | 5/2018 |
| JP | 2015529271 A | 10/2015 |
| JP | 2019533749 A | 11/2019 |
| RU | 2167164 C2 | 5/2001 |
| RU | 2466787 C2 | 11/2012 |
| WO | 9704015 A1 | 2/1997 |
| WO | 0002929 A1 | 1/2000 |
| WO | 03080253 A1 | 10/2003 |
| WO | 2012031986 A1 | 3/2012 |
| WO | 2018115236 A1 | 6/2018 |
| WO | 2019154756 A1 | 8/2019 |
| WO | 2021116156 A1 | 6/2021 |

\* cited by examiner

APPARATUS AND PROCESS FOR THE GAS-PHASE POLYMERIZATION

This application is the U.S. National Phase of PCT International Application PCT/EP2020/085237, filed Dec. 9, 2020, claiming benefit of priority to European Patent Application No. 19215247.8, filed Dec. 11, 2019, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure provides an apparatus for carrying out a catalytic gas-phase olefin polymerization, having at least two interconnected polymerization zones, and a related process.

BACKGROUND OF THE INVENTION

Polyolefins are by a class of synthetic polymers used because of the polymers' low costs of production, light weight, and high chemical resistance. In some instances, mechanical properties are achieved through copolymerization, blending and additives.

In some instances, polyolefins are produced by gas-phase polymerization. In some instances, the processes are fluidized-bed gas-phase processes, wherein the polymer is produced in a vertical cylindrical zone. In some instances, the reaction gases exiting the reactor are taken up by a compressor, cooled, and sent back with make-up monomers and hydrogen to the bottom of the bed through a distributor. In some instances, entrainment of solid to the gas is limited by dimensioning the upper part of the reactor, where the gas velocity is reduced. The flow rate of the circulating gas is set to assure a velocity within a range above the minimum fluidization velocity and below the "transport velocity". In some instances, the heat of reaction is removed by cooling the circulating gas. In some instances, the catalyst components are continuously fed into the polymerization vessel. In some instances, the composition of the gas-phase controls the composition of the resulting polymer. However, and in some instances, fluidized-bed processes do not control adequately the molecular weight distribution of the resulting polymers nor the comonomer compositions of the resulting polymers.

SUMMARY OF THE INVENTION

In a general embodiment, the present disclosure provides an apparatus for carrying out a catalytic gas-phase olefin polymerization having
  at least a first polymerization zone, adapted and arranged for growing polymer particles to flow upward under fast fluidization or transport conditions, and
  at least a second polymerization zone, adapted and arranged for the growing polymer particles to flow downward; and
  a gas/solid separation zone having a cylindrical shape; wherein
  the second polymerization zone has an upper part being connected to the separation zone, a lower part being connected to the upper part, and a line for feeding a gas, a liquid, or a combination of both into the second polymerization zone;
  the first polymerization zone being connected to the separation zone by a connecting part; and
  the lower part of the second polymerization zone being connected to the lower part of the first polymerization zone by a connecting part;
  wherein the ratio of the diameter D01 of the separation zone to the diameter D03 of the upper part of the second polymerization zone is 1.02 to 1.5;
  wherein the ratio of the height H01 of the separation zone to the diameter D01 of the separation zone is 2.5 to 4.5; and
  wherein the ratio of the diameter D03 of the upper part of the second polymerization zone to the diameter D04 of the lower part of the second polymerization zone is 1.2 to 2.

In some embodiments, the ratio of the diameter D01 of the separation zone to the diameter D03 of the upper part (5) of the second polymerization zone is 1.02 to 1.5, alternatively 1.05 to 1.4, alternatively 1.08 to 1.3. In some embodiments, the ratio of the height H01 of the separation zone to the diameter D01 of the separation zone is 2.5 to 4.5, alternatively 2.8 to 4.2, alternatively 2.9 to 4. In some embodiments, the ratio of the diameter D03 of the upper part of the second polymerization zone to the diameter D04 of the lower part of the second polymerization zone is 1.2 to 2, alternatively 1.3 to 1.8, alternatively 1.4 to 1.7.

In some embodiments, the height H05 of the upper part of the second polymerization zone is 5000 to 10000 mm, alternatively 6000 to 8000 mm, alternatively 6800 to 7200 mm.

In some embodiments, the ratio of the height H05 of the upper part of the second polymerization zone to the diameter D03 of the upper part of the second polymerization zone is 2 to 4, alternatively 2 to 3.8, alternatively 2 to 3.6.

In some embodiments, the separation zone and the upper part of the second polymerization zone are connected by a first connecting part having a height H02 and an associated angle A01, wherein the diameter of the connecting part constantly decreases from the diameter D01 of the separation zone to the diameter D03 of the upper part of the second polymerization zone.

In some embodiments, the upper part of the second polymerization zone and the lower part of the second polymerization zone are connected by a second connecting part having a height H06 and an associated angle A02, wherein the diameter of the connecting part constantly decreases from the diameter D03 of the upper part of the second polymerization zone to the diameter D04 of the lower part of the second polymerization zone.

In some embodiments, the angle A01 of the first connecting part connecting the separation zone to the upper part of the second polymerization zone is 5 to 25°, alternatively 8 to 20°, alternatively 10 to 15°.

In some embodiments, the angle A02 of the second connecting part connecting the upper part of the second polymerization zone to the lower part of the second polymerization zone is 5 to 25°, alternatively 8 to 20°, alternatively 10 to 15°.

In some embodiments, the height H05' from the bottom tangent line of the upper part of the second polymerization zone to the entrance of the feeding line into the second polymerization zone is 2000 to 6000 mm, alternatively 2500 to 5000 mm, alternatively 3000 to 4500 mm.

In some embodiments, the apparatus further has at least one of the following:

i) a recycle line connecting the separation zone to one or more points of reintroduction into the connecting part or into the first polymerization zone;
ii) a line for feeding a catalyst into the first polymerization zone;
iii) a line for feeding monomers into the apparatus;
iv) a discharge system for discharging polymer from the second polymerization zone.

In some embodiments, the present disclosure provides a process for carrying out a catalytic gas-phase olefin polymerization in the apparatus, including the steps of (a) feeding one or more olefins into the apparatus, (b) contacting the olefins and a catalyst under reaction conditions in the at least first polymerization zone and the at least second polymerization zone, and (c) collecting the polymer product from the at least second polymerization zone, wherein the growing polymer particles (I) flow upward through the first polymerization zone under fast fluidization or transport conditions, (II) leave the first polymerization zone, (III) pass through the gas/solid separation zone, (IV) enter the second polymerization zone, (V) flow downward under the action of gravity, (VI) leave the second polymerization zone, and (VII) are reintroduced, at least partially, into the first polymerization zone, thereby establishing a circulation of polymer between the first polymerization zone and the second polymerization zone, wherein the second polymerization zone has a bed of densified polymer particles.

In some embodiments, introducing a gas or liquid into the second polymerization zone via feeding line prevents completely or partially the gas mixture in the first polymerization zone from flowing down the upper part of the second polymerization zone; and the gas mixture in the second polymerization zone differs from the gas mixture in the first polymerization zone.

In some embodiments, the surface of the bed of densified polymer particles is located in the upper part of the second polymerization zone.

In some embodiments, introducing the gas or liquid into the upper part of the second polymerization zone over or below the surface of the bed of densified polymer particles prevents the gas mixture in the first polymerization zone from entering the second polymerization zone.

In some embodiments, the polymerization is a homopolymerization of ethylene, a copolymerization of ethylene and one or more other olefins selected from the group consisting of 1-butene, 1-hexene, and 1-octene, a homopolymerization of propylene, or a copolymerization of propylene and one or more other olefins selected from the group consisting of ethylene, 1-butene, and 1-hexene.

DETAILED DESCRIPTION OF THE INVENTION

Figure 1:
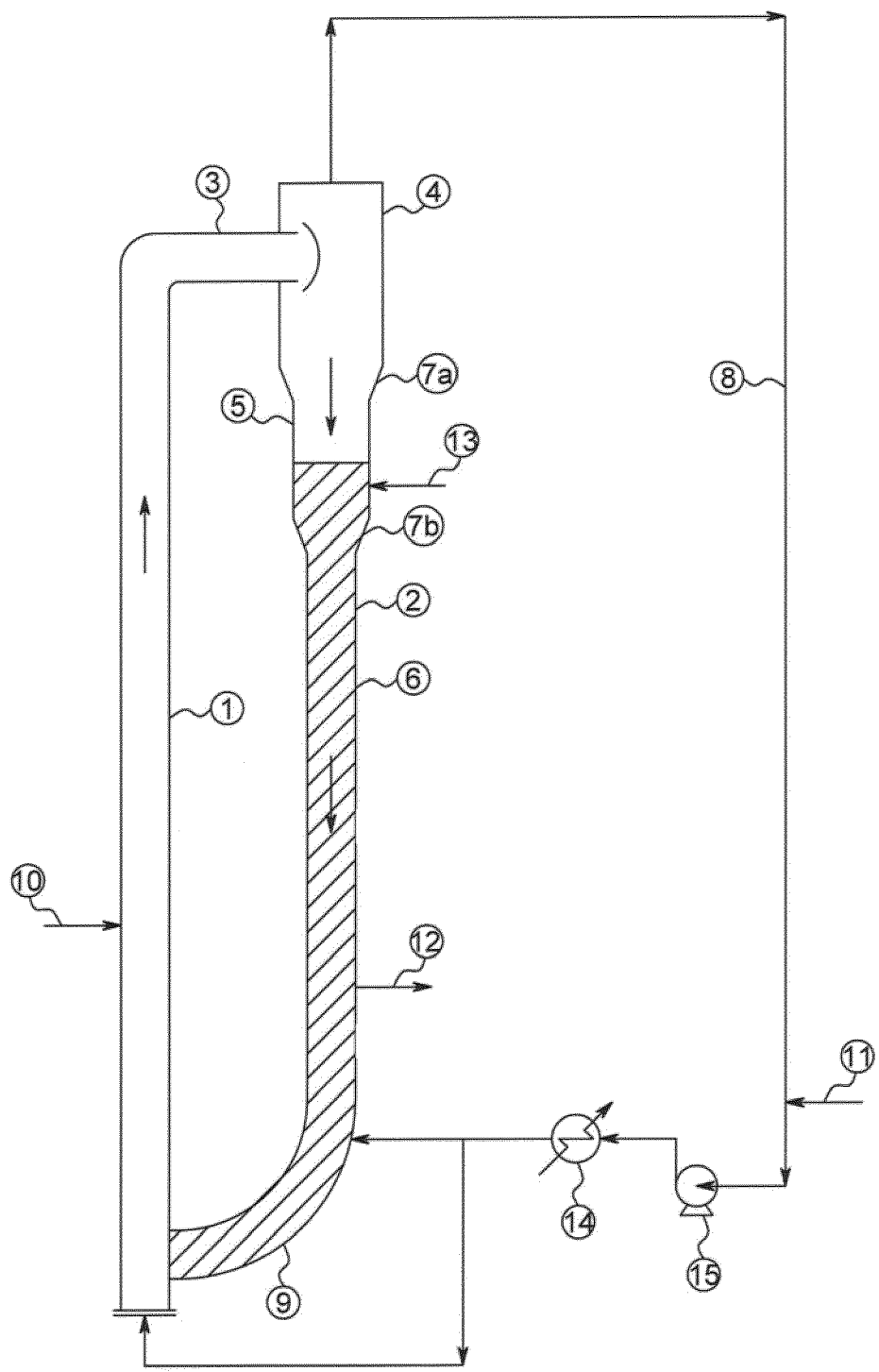
FIG. 1 is a schematic of an apparatus for carrying out a catalytic gas-phase olefin polymerization.
Figure 2:
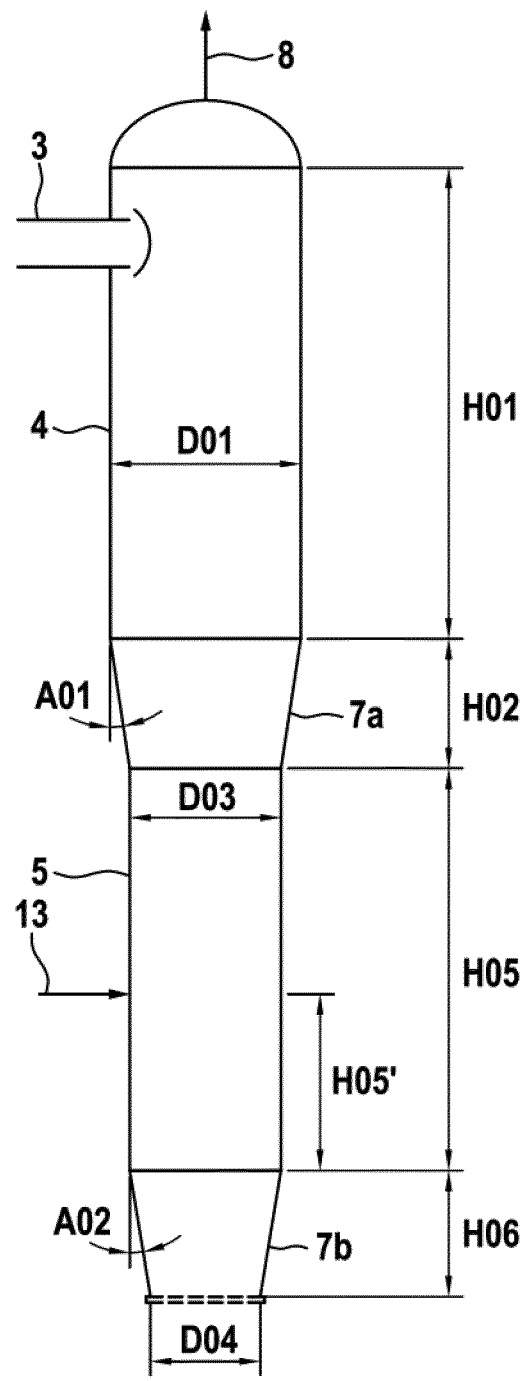
FIG. 2 is an excerpt of the top part of the second polymerization zone.

In some embodiments, the present disclosure provides an apparatus for carrying out a catalytic gas-phase olefin polymerization having
at least a first polymerization zone (1) having a cylindrical shape, adapted and arranged for growing polymer particles to flow upward under fast fluidization or transport conditions, and
at least a second polymerization zone (2), adapted and arranged for the growing polymer particles to flow downward; and
a gas/solid separation zone (4) having a height H01 and a diameter D01;
wherein
the second polymerization zone (2), having a height H05 and diameter D03, has an upper part (5) being connected to the separation zone (4), a lower part (6) being connected to the upper part (5), and a line (13) for feeding a gas, a liquid, or a combination of both into the second polymerization zone (2);
the first polymerization zone (1) being connected to the separation zone (4) by a connecting part (3);
the lower part (6) of the second polymerization zone (2) being connected to the lower part of the first polymerization zone (1) by a connecting part (9);
wherein the ratio of the height H01 of the separation zone (4) to the diameter D01 of the separation zone (4) is 2.5 to 4.5, alternatively 2.8 to 4.2, alternatively 2.9 to 4.

In some embodiments, the olefins are 1-olefins, that is, hydrocarbons having terminal double bonds, without being restricted thereto. In some embodiments, the olefins are nonpolar olefinic compounds. In some embodiments, the 1-olefins are linear or branched $C_2$-$C_{12}$-1-alkenes, conjugated dienes, nonconjugated dienes, and mixtures of various 1-olefins. In some embodiments, the 1-olefins are linear $C_2$-$C_{10}$-1-alkenes or branched $C_2$-$C_{10}$-1-alkenes. In some embodiments, the linear $C_2$-$C_{10}$-1-alkenes are selected from the group consisting of ethylene, propylene, 1-butene, 1-pentene, 1-hexene, 1-heptene, 1-octene, and 1-decene. In some embodiments, the branched $C_2$-$C_{10}$-1-alkene is 4-methyl-1-pentene. In some embodiments, the conjugated and nonconjugated dienes are selected from the group consisting of 1,3-butadiene, 1,4-hexadiene, and 1,7-octadiene. In some embodiments, the olefins have the double bond as part of a cyclic structure. In some embodiments, the cyclic structure has one or more ring systems. In some embodiments, the olefins having a cyclic structure are selected from the group consisting of cyclopentene, norbornene, tetracyclododecene, methylnorbornene, 5-ethylidene-2-norbornene, norbornadiene, and ethylnorbornadiene. In some embodiments, the polymerization involves mixtures of two or more olefins.

In some embodiments, the apparatuses of the present disclosure are used for the homopolymerization or copolymerization of ethylene or propylene. In some embodiments, the apparatuses are used for the homopolymerization or copolymerization of ethylene. In some embodiments, the comonomers in propylene polymerization are up to 40 wt. % of ethylene, 1-butene, 1-hexene, or combinations thereof, alternatively from 0.5 wt. % to 35 wt. % of ethylene, 1-butene, 1-hexene, or combinations thereof. In some embodiments, the comonomers in ethylene polymerization are up to 20 wt. %, alternatively from 0.01 wt. % to 15 wt. %, alternatively from 0.05 wt. % to 12 wt. %. In some embodiments, the comonomers in ethylene polymerization are $C_3$-$C_8$-1-alkenes. In some embodiments, the $C_3$-$C_8$-1— alkenes are selected from the group consisting of 1-butene, 1-pentene, 1-hexene, 1-octene, and combinations thereof. In some embodiments, ethylene is copolymerized with from 0.1 wt. % to 12 wt. % of 1-hexene, 1-butene, and combinations thereof.

In some embodiments, selection of the ratio between the height H01 of the separation zone (4) and the diameter D01 of the separation zone (4) provides for effective separation of the gas/solid mixture introduced into the separation zone (4) from the first polymerization zone (1). In some embodiments, selection of the ratio H01/D01 avoids or reduces polymer carry-over in the gas leaving the separation zone (4).

It is believed that the multizone circulating reactor (MZCR) relies on providing multiple reaction zones having different reaction conditions. It is further believed that, because polymerization is carried out in a circular process, separation of the gas mixtures in the first polymerization zone (1) and the second polymerization zone (2) facilitates an effective process and broad molecular weight distribution. In some embodiments, limiting the carry-over of polymer in the gas leaving the separation zone (4) and separating the gas of polymerization zone (1) from the gas of polymerization zone (2) are achieved through selecting the diameter D01 of the separation zone (4) and the diameter D03 of the upper part (5) of the second polymerization zone (2). In some embodiments, the ratio D01/D03 of the diameter D01 of the separation zone (4) to the diameter D03 of the upper part (5) of the second polymerization zone (2) is 1.02 to 1.5, alternatively 1.05 to 1.4, alternatively 1.08 to 1.3. In some embodiments, selection of the ratio of the diameter D01 of the separation zone (4) to the diameter D03 of the upper part (5) of the second polymerization zone (2) provides an efficient gas/solid separation in the separation zone (4), thereby ensuring separation of the gas mixture in the first polymerization zone (1) from the gas within the second polymerization zone (2).

In some embodiments, and independently from the polymerization capacity of the apparatuses, the height H05 of the upper part (5) of the second polymerization zone (2) is 5000 to 10000 mm, alternatively 6000 to 8000 mm, alternatively 6800 to 7200 mm. In some embodiments, the height of the upper part (5) of the second polymerization zone (2) provides enough powder residence time for a gas separation and enough room for level control and variation at the same time without affecting the efficiency of the gas/solid separation zone (4).

In some embodiments, selection of the height of the upper part (5) of the second polymerization zone (2) and the diameter D03 of the upper part (5) of the second polymerization zone (2) minimize the risk of an overflow of the upper part (5) of the second polymerization zone (2) and of harm to the separation efficacy of the separation zone (4). In some embodiments, the ratio H05/D03 of the height H05 of the upper part (5) of the second polymerization zone (2) and the diameter D03 of said upper part (5) is 2 to 4, alternatively 2 to 3.8, alternatively 2 to 3.6.

In some embodiments, the ratio D03/D04 of the diameter D03 of the upper part (5) of the second polymerization zone (2) and the diameter D04 of the lower part (6) of the second polymerization zone (2) is 1.2 to 2, alternatively 1.3 to 1.8, alternatively 1.4 to 1.7. In some embodiments, a much lower velocity of the solid in the upper part (5) of the second polymerization zone (2) is maintained than in the lower part (6) of the second polymerization zone (2), thereby avoiding fluidization which would prevent the barrier from being effective.

In some embodiments, the separation zone (4) has a cylindrical shape, that is, the diameter D01 of the separation zone (4) is constant over the entire height H01 of the separation zone (4). In some embodiments, the upper part (5) of the second polymerization zone (2) has a cylindrical shape, that is, the diameter D03 of the upper part (5) of the second polymerization zone (2) is constant over the entire height H05 of the upper part (5) of the second polymerization zone (2). As used herein, the term "constant diameter" refers to a diameter, which deviates from a given value by less than 5%, alternatively less than 2%, alternatively less than 0.5%, alternatively less than 0.1%.

In some embodiments, the separation zone (4) and the upper part (5) of the second polymerization zone (2) are connected by a first connecting part (7a) having a height H02 wherein the diameter of the connecting part (7a) constantly decreases from the diameter D01 of the separation zone (4) to the diameter D03 of the upper part (5) of the second polymerization zone (2). In some embodiments, the diameter of the connecting part (7a) constantly decreases over the total height H02 of the connecting part (7a). In some embodiments, the upper part (5) of the second polymerization zone (2) and the lower part (6) of the second polymerization zone are by a second connecting part (7b) having a height H06 wherein the diameter of the connecting part (7b) constantly decreases from the diameter D03 of the upper part (5) of the second polymerization zone (2) to the diameter D04 of the lower part (6) of the second polymerization zone (2). In some embodiments, the diameter of the connecting part (7b) constantly decreases over the total height H06 of the second connecting part (7b).

In view of the decrease in diameter, the first connecting part (7a) and the second connecting part (7b) of the second polymerization zone (2) each has a conical and/or troncoconical shape and an associated angle A01 and A02, respectively. In some embodiments, the angle A01 of the first (tronco-)conically shaped connecting part (7a) is 5 to 25°, alternatively 8 to 20°, alternatively 10 to 15°. In some embodiments, the angle A02 of the second (tronco-)conically shaped connecting part (7b) is 5 to 25°, alternatively 8 to 20°, alternatively 10 to 15°. It is believed that a smooth downward flow of the polymer through the second polymerization zone (2) is ensured when the angles A01 and A02 are kept within the set limits, and stagnation of the polymer powder is reduced.

Within the MICR technology, the separation of the multiple reaction zones is achieved when a barrier gas, a barrier liquid, or a combination thereof prevents the gas mixture of one reaction zone from entering another reaction zone. In some embodiments, a certain distance between the entrance of the feed line for introducing a barrier gas, a barrier liquid, or a combination thereof, into the second polymerization zone (2) and the bottom tangent line of the upper part (5) of the second polymerization zone (2) ensures separation. In some embodiments, the distance H05' from the bottom tangent line of the upper part (5) of the second polymerization zone (2) of the apparatus to the entrance of the feeding line (13) for feeding a gas, a liquid, or a combination thereof, into the second polymerization zone (2) is 2000 to 6000 mm, alternatively 2500 to 5000 mm, alternatively 3000 to 4500 mm.

In some embodiments, the apparatus further has at least one of the following:
  i) a recycle line (8) connecting the separation zone (4) to one or more points of reintroduction into the connecting part (9), the first polymerization zone (1), or both;
  ii) a line (10) for feeding a catalyst into the first polymerization zone (1);
  iii) a line (11) for feeding monomers into the apparatus;
  iv) a discharge system (12) for discharging polymer from the second polymerization zone (2).

In some embodiments, the recycle line is equipped with a heat exchanger (14) and a compressor (15)

In some embodiments, the first polymerization zone (1) and the second polymerization zone (2) are connected or employed as described in Patent Cooperation Treaty Publication Nos. WO 00/02929 and WO 97/04015.

In some embodiments, the present disclosure further provides a process for carrying out a catalytic gas-phase olefin polymerization in the apparatus. The process includes the steps of (a) feeding one or more olefins into the apparatus, (b) contacting the olefins and a catalyst under reaction conditions in the at least first polymerization zone (1) and the at least second polymerization zone (2), and (c) collecting the polymer product from the at least second polymerization zone (2), wherein the growing polymer particles (I) flow upward through the first polymerization zone (1) under fast fluidization or transport conditions, (II) leave the first polymerization zone (1), (III) pass through the gas/solid separation zone (4), (IV) enter the second polymerization zone (2), (V) flow downward under the action of gravity, (VI) leave the second polymerization zone (2), and (VII) are reintroduced, at least partially, into the first polymerization zone (1), thereby establishing a circulation of polymer between the first polymerization zone (1) and the second polymerization zone (2), wherein the second polymerization zone (2) has a bed of densified polymer particles.

In some embodiments, the surface of the bed of densified polymer particles is located in the upper part (5) of the second polymerization zone (2).

In some embodiments, different polymerization zones are established by preventing the gas mixture in the first polymerization zone (1) from entering the second polymerization zone (2), thereby broadening the molecular weight distribution of the resulting polyolefins or obtaining copolymers having different comonomer distributions. In some embodiments, introducing a barrier gas, a barrier liquid, or a combination thereof into the second polymerization zone (2) via a feeding line (13) prevents completely or partially the gas mixture in the first polymerization zone (1) from flowing down the upper part (5) of the second polymerization zone (2). In some embodiments, the gas mixture in the second polymerization zone (2) differs from the gas mixture in the first polymerization zone (1).

In some embodiments, introducing a gas or a liquid into the upper part (5) of the second polymerization zone (2) over or below the surface of the bed of densified polymer particles prevents the gas mixture in the first polymerization zone (1) from entering the second polymerization zone (2).

LIST OF REFERENCE SIGNS 1 first polymerization zone
2 second polymerization zone
3 connecting part
4 separation zone
5 upper part of the second polymerization zone
6 lower part of the second polymerization zone
7a first connecting part connecting the separation zone and the upper part of the second polymerization zone
7b second connecting part connecting the upper part and the lower part of the second polymerization zone
8 recycle line
9 connecting part
10 catalyst feeding line
11 monomer feeding line
12 polymer discharge system
13 barrier gas/liquid feeding line
14 heat exchanger
15 compressor

The invention claimed is:

1. An apparatus for carrying out a catalytic gas-phase olefin polymerization comprising
   at least a first polymerization zone, adapted and arranged for growing polymer particles to flow upward under fast fluidization or transport conditions, and
   at least a second polymerization zone, adapted and arranged for the growing polymer particles to flow downward; and
   a gas/solid separation zone having a cylindrical shape;
   wherein
   the second polymerization zone has an upper part being connected to the separation zone, a lower part being connected to the upper part and a line for feeding a gas, a liquid, or a combination of both into the second polymerization zone;
   the first polymerization zone being connected to the separation zone by a connecting part; and
   the lower part of the second polymerization zone being connected to the lower part of the first polymerization zone by a connecting part;
   wherein the ratio of the diameter D01 of the separation zone to the diameter D03 of the upper part of the second polymerization zone is 1.02 to 1.5;
   wherein the ratio of the height H01 of the separation zone to the diameter D01 of the separation zone is 2.5 to 4.5; and
   wherein the ratio of the diameter D03 of the upper part of the second polymerization zone to the diameter D04 of the lower part of the second polymerization zone is 1.2 to 2.

2. The apparatus of claim 1, wherein the height H05 of the upper part of the second polymerization zone is 5000 to 10000 mm.

3. The apparatus of claim 1, wherein the ratio of the height H05 of the upper part of the second polymerization zone to the diameter D03 of the upper part of the second polymerization zone is 2 to 4.

4. The apparatus of claim 1, wherein the separation zone and the upper part of the second polymerization zone are connected by a first connecting part having a height H02 and an associated angle A01, wherein the diameter of the connecting part constantly decreases from the diameter D01 of the separation zone to the diameter D03 of the upper part of the second polymerization zone.

5. The apparatus of claim 1, wherein the upper part of the second polymerization zone and the lower part of the second polymerization zone are connected by a second connecting part having a height H06 and an associated angle A02, wherein the diameter of the connecting part constantly decreases from the diameter D03 of the upper part of the second polymerization zone to the diameter D04 of the lower part of the second polymerization zone.

6. The apparatus of claim 4, wherein the angle A01 of the first connecting part connecting the separation zone to the upper part of the second polymerization zone is 5 to 25°.

7. The apparatus of claim 5, wherein the angle A02 of the second connecting part connecting the upper part of the second polymerization zone to the lower part of the second polymerization zone is 5 to 25°.

8. The apparatus of claim 1, wherein the height H05' from the bottom tangent line of the upper part of the second polymerization zone to the entrance of the feeding line into the second polymerization zone is 2000 to 6000 mm.

9. The apparatus of claim 1, further comprising at least one of the following:

i) a recycle line connecting the separation zone to one or more points of reintroduction into the connecting part or into the first polymerization zone;
ii) a line for feeding a catalyst into the first polymerization zone;
iii) a line for feeding monomers into the apparatus;
iv) a discharge system for discharging polymer from the second polymerization zone.

10. A process for carrying out a catalytic gas-phase olefin polymerization in the apparatus of claim 1, comprising the steps of:
   (a) feeding one or more olefins into the apparatus,
   (b) contacting the olefins and a catalyst under reaction conditions in the at least first polymerization zone and the at least second polymerization zone, and
   (c) collecting the polymer product from the at least second polymerization zone,
   wherein the growing polymer particles
   (I) flow upward through the first polymerization zone under fast fluidization or transport conditions,
   (II) leave the first polymerization zone,
   (III) pass through the gas/solid separation zone, and
   (IV) enter the second polymerization zone,
   (V) flow downward under the action of gravity,
   (VI) leave the second polymerization zone, and
   (VII) are reintroduced, at least partially, into the first polymerization zone,
   thereby establishing a circulation of polymer between the first polymerization zone and the second polymerization zone, wherein the second polymerization zone comprises a bed of densified polymer particles.

11. The process of claim 10, wherein introducing a gas or liquid into the second polymerization zone via feeding line prevents completely or partially the gas mixture in the first polymerization zone from flowing down the upper part of the second polymerization zone, and the gas mixture in the second polymerization zone differs from the gas mixture in the first polymerization zone.

12. The process of claim 11, wherein the surface of the bed of densified polymer particles is located in the upper part of the second polymerization zone.

13. The process of claim 11, wherein introducing the gas or liquid into the upper part of the second polymerization zone over or below the surface of the bed of densified polymer particles prevents the gas mixture in the first polymerization zone from entering the second polymerization zone.

14. The process of claim 10, wherein the polymerization is a homopolymerization of ethylene, a copolymerization of ethylene and one or more other olefins selected from the group consisting of 1-butene, 1-hexene, and 1-octene, a homopolymerization of propylene, or a copolymerization of propylene and one or more other olefins selected from the group consisting of ethylene, 1-butene, and 1-hexene.

15. The process of claim 10, wherein the height H05 of the upper part of the second polymerization zone is 5000 to 10000 mm.

16. The process of claim 10, wherein the ratio of the height H05 of the upper part of the second polymerization zone to the diameter D03 of the upper part (5) of the second polymerization zone is 2 to 4.

17. The process of claim 10, wherein the separation zone and the upper part of the second polymerization zone are connected by a first connecting part having a height H02 and an associated angle A01, wherein the diameter of the connecting part constantly decreases from the diameter D01 of the separation zone to the diameter D03 of the upper part of the second polymerization zone.

18. The process of claim 10, wherein the upper part of the second polymerization zone and the lower part of the second polymerization zone are connected by a second connecting part having a height H06 and an associated angle A02, wherein the diameter of the connecting part constantly decreases from the diameter D03 of the upper part of the second polymerization zone to the diameter D04 of the lower part of the second polymerization zone.

19. The process of claim 17, wherein the angle A01 of the first connecting part connecting the separation zone to the upper part of the second polymerization zone is 5 to 25°.

20. The process of claim 18, wherein the angle A02 of the second connecting part connecting the upper part of the second polymerization zone to the lower part of the second polymerization zone is 5 to 25°.

* * * * *